Dec. 5, 1950 — J. G. RADTKE — 2,533,198
EDGE FINDER
Filed Jan. 26, 1945 — 3 Sheets-Sheet 1
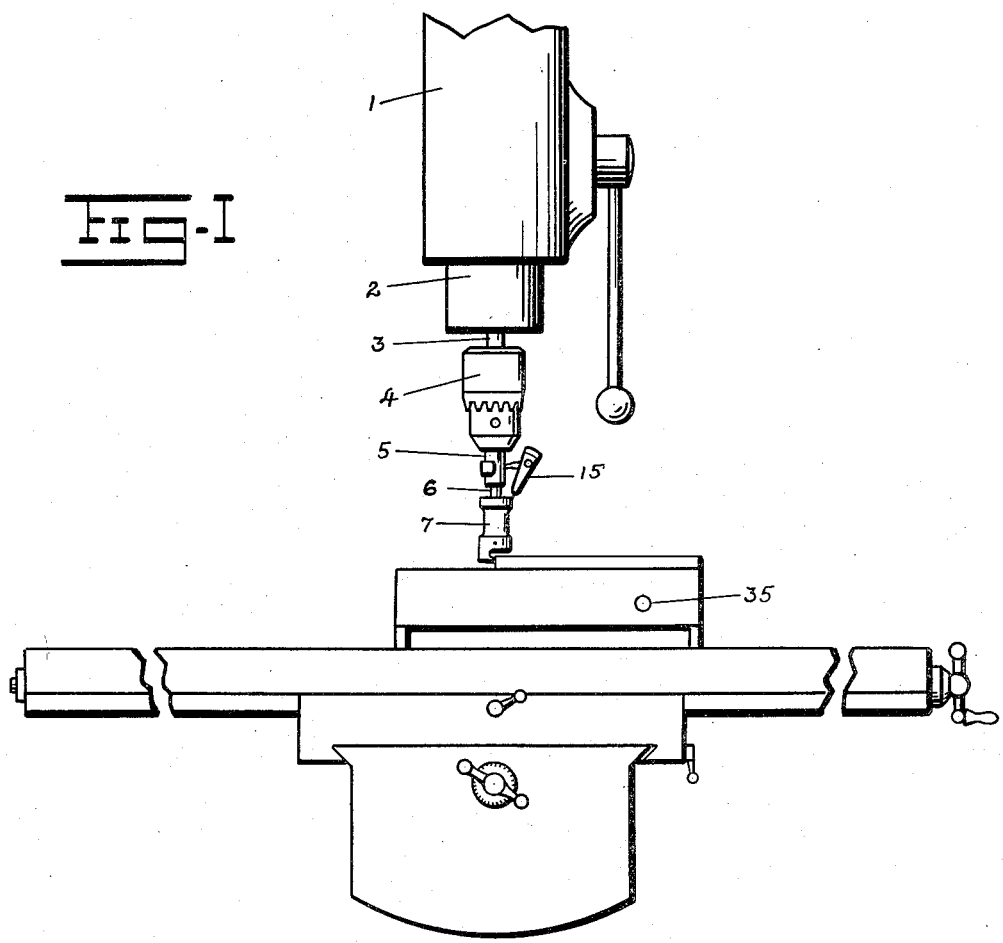
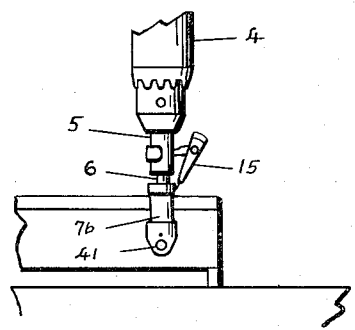
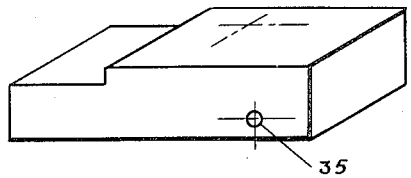
Inventor
James G. Radtke
By Frank Keifer
Attorney Dec. 5, 1950 J. G. RADTKE 2,533,198
EDGE FINDER
Filed Jan. 26, 1945 3 Sheets-Sheet 2
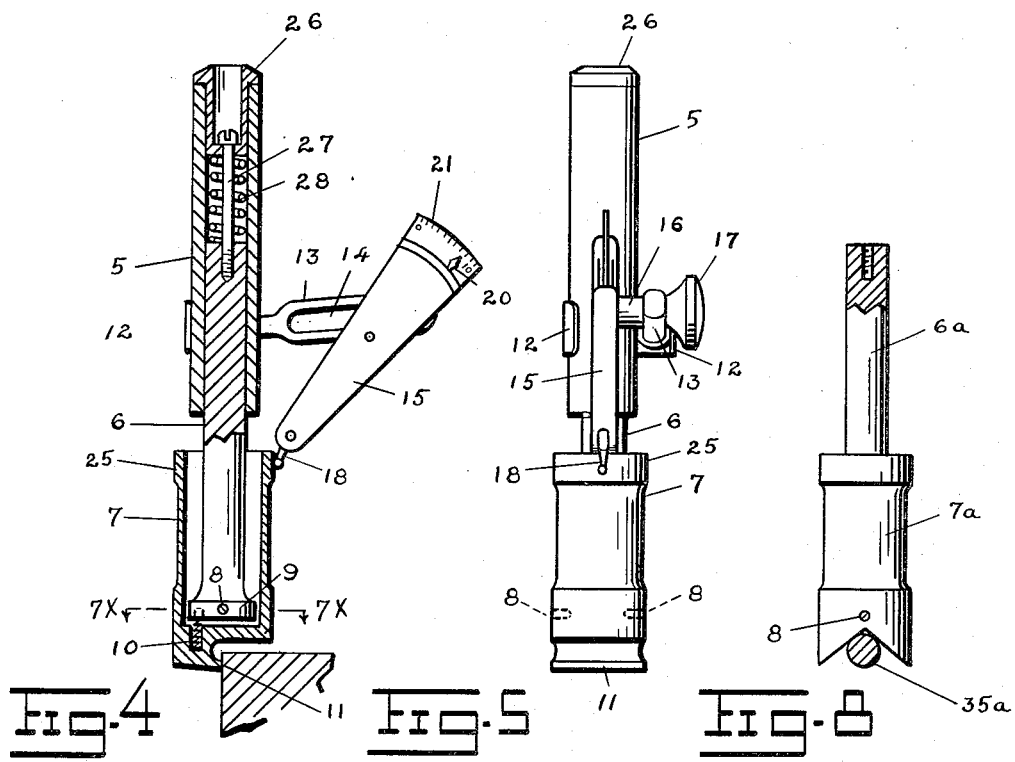
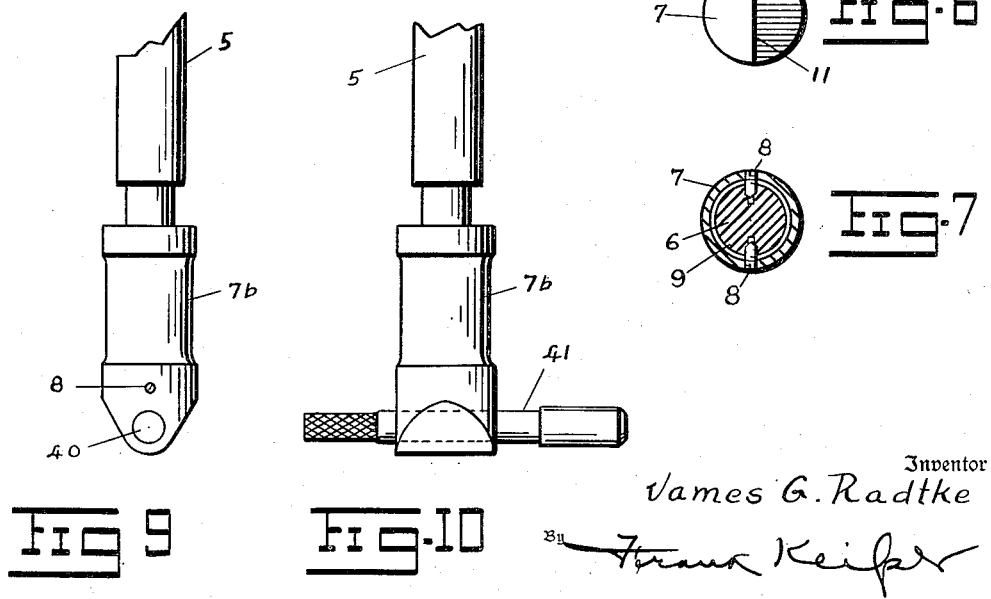
Inventor
James G. Radtke
By Frank Keifer
Attorney Dec. 5, 1950  J. G. RADTKE  2,533,198
EDGE FINDER
Filed Jan. 26, 1945  3 Sheets-Sheet 3
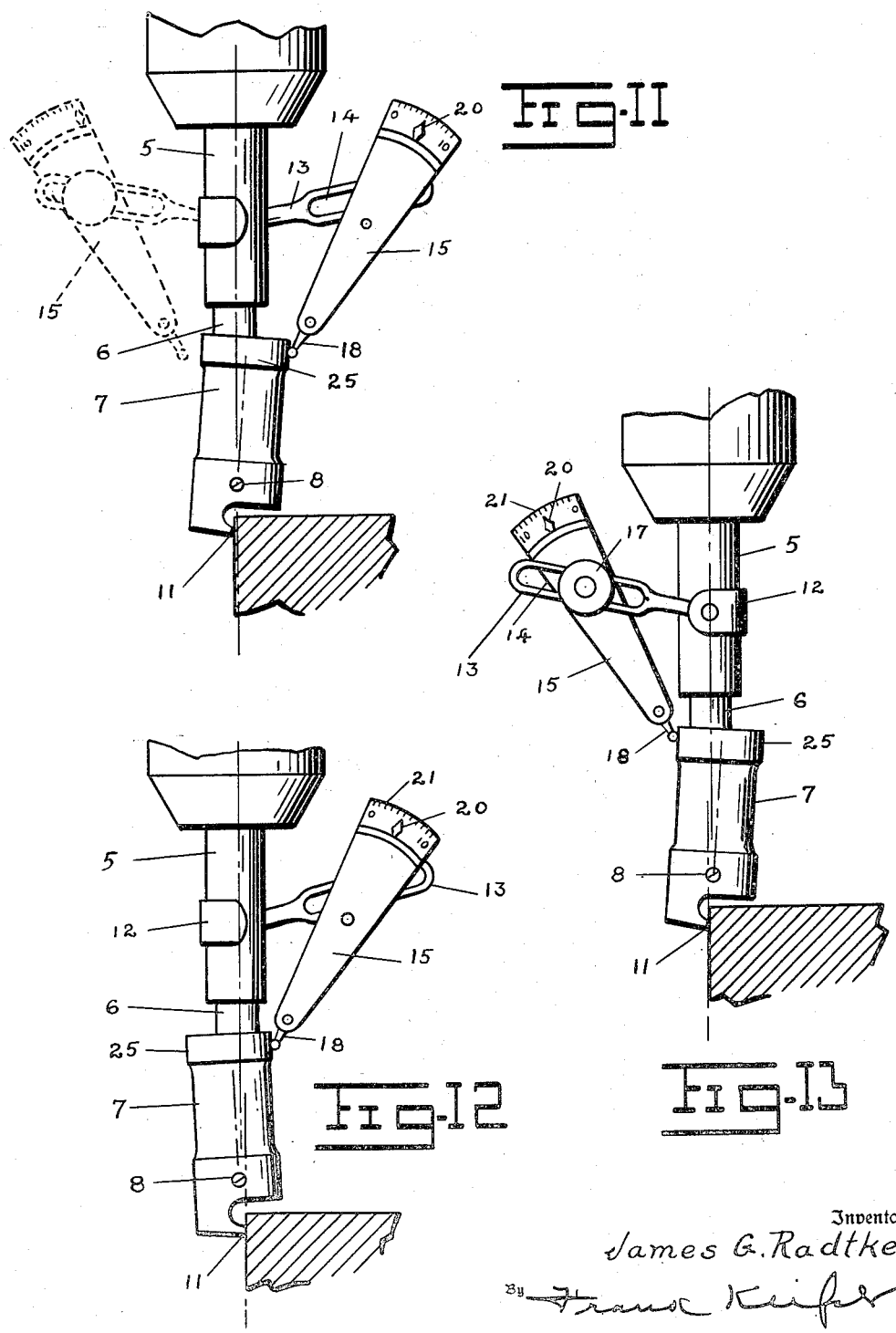
Inventor
James G. Radtke
By Frank Kiefer
Attorney Patented Dec. 5, 1950

2,533,198

UNITED STATES PATENT OFFICE 2,533,198

EDGE FINDER

James G. Radtke, Rochester, N. Y.

Application January 26, 1945, Serial No. 574,651

15 Claims. (Cl. 33—169)

In forming a tool or a jig or any other equivalent device it is often necessary to bore a hole in a plate or block with the axis of the hole accurately located with reference to two adjacent edges of the block or plate in which the hole is being bored, the edges of the block ordinarily being at right angles to each other. This hole is ordinarily drilled and bored in a jig boring machine which is much the same as a milling machine in that it has a vertical spindle, but the jig boring machine is provided with a work table on which the work piece is held which table is provided with refinements of adjustment longitudinally and laterally that will make it possible to locate the hole both longitudinally and laterally in the work piece with an error of a fraction of .001 of an inch and a possibility of no error.

It will be understood that a jig boring machine is provided with a table that is adjusted longitudinally by one screw and can then be adjusted laterally or transversely by another screw so as to bring the work table with the work piece thereon to the desired position with reference to the axis of the spindle of the jig boring machine. These movements longitudinally and laterally are fixed by measurements prescribed on the drawing in accordance with which the work piece is to be fashioned.

The object of this invention is to provide a mechanical instrument that is attached to the spindle of the jig boring machine instead of the set up devices heretofore used and is used for the purpose of locating first one edge of the work piece directly under the true axis of the spindle of the jig boring machine. The spindle with the instrument thereon can then be raised clear of the work piece, after which the table with the work piece thereon is moved under the spindle so as to place the spindle back from the edge of the work piece by a measurement that is prescribed on the drawing in accordance with which the work piece is to be fashioned.

The table with the work piece thereon is then moved in a direction at right angles to the first movement until the second edge of the work piece is brought into line with the instrument and the spindle with the instrument thereon is then lowered and adjusted until the instrument makes contact with the edge of the work piece and the work piece is adjusted until its edge is brought directly under the true axis of the spindle. The spindle with the instrument thereon can then be again raised clear of the work piece and the table with the workpiece thereon is moved under the spindle so as to place the spindle back from the edge of the work piece by a measurement that is also prescribed on the drawing in accordance with which the work piece is to be fashioned.

In making these two adjustments two imaginary lines will be traced on the work piece and where these lines cross is the point where the center of the hole to be bored by the jig boring machine is located. The drill is then substituted in the spindle for the instrument. The hole is then drilled, and bored in the usual manner.

Another object of the invention is to provide a device on the instrument that will magnify the movement of the instrument or the work piece with reference to each other and thus decrease the possibility of error when the instrument is positioned against the edge of the work piece so that the edge or the starting point from which the measurement is made will be accurately located under the axis of the spindle of the jig borer.

These and other objects of the invention will be illustrated in the drawings, described in the specification and pointed out in the claims at the end thereof.

In the drawings:

Figure 1 is a front elevation of the work table and spindle of the jig boring machine in which the instrument is used to locate a hole by using two dimensions both of which are in the same plane, and are measured from two different edges of the work piece that are not parallel to each other.

Figure 2 is a front elevation of the spindle and instrument when used in making measurement from a hole previously bored in the side of the work piece.

Figure 3 is a perspective view of the work piece shown in Figure 2.

Figure 4 is a vertical section through the instrument showing the indicator in front elevation.

Figure 5 is a side elevation of the instrument looking at it from the right in Figure 4. Both Figures 4 and 5 show the adapter for contacting with the edge of the work piece in which respect they correspond with the instrument shown in Figure 1.

Figure 6 is a bottom plan view of the instrument shown in Figure 4.

Figure 7 is a horizontal section on the line 7x—7x of Figure 4 looking at it from above.

Figure 8 shows a modified form of the instrument which at its lower end is adapted to make contact with a pin inserted in the work piece instead of contacting with the edge of the workpiece, the pin being separate from the instrument.

Figure 9 is a front elevation of the instrument in which the pin is a part of the instrument and is mounted to slide therein.

Figure 10 is a side elevation of the instrument shown in Figure 9.

Figure 11 is a front elevation of the instrument applied to the edge of the work piece in which the work piece must be moved to the right to get it in the correct position with reference to the axis of the spindle, it also being understood that the indicator is shown in full lines at the right of the spindle and the spindle, sleeve and indicator can be rotated 180° to the dotted line position.

Figures 12 and 13 show the position of the instrument and its indicator when the work piece is in the correct position and the error is in the concentricity of the adapter or spindle.

In the drawings like reference numerals indicate like parts.

In the drawings reference numeral 1 indicates the column. 2 indicates the quill which has a rack on it by which the spindle is raised and lowered. The quill does not rotate. 3 indicates the spindle of the jig borer. 4 indicates a chuck which is attached to the spindle and rotates with it. This chuck can be any of the well-known standard patterns, and constitutes no part of my invention. 5 indicates the sleeve and 6 indicates the shank. The shank can turn in the sleeve. (See Figures 1 and 4.) 7 indicates a thimble pivoted on the shank 6 by the pivot screws 8, 8. The bottom of the shank 6 is expanded to form the shoulder or head 9. In the bottom of the thimble is found a spring 10 which bears against the head 9 on the shank 6, the expansion of which serves to hold the upper end of the thimble in retracted position. On the lower end of the thimble is formed a contact edge 11 which is adapted to bear against the edge of the work piece. This edge is preferably ¾" or more in length, the length being important so as to make an accurate bearing on the edge of the work piece.

It will be understood that the contact edge on the thimble is straight and is placed substantially under the pivot on which the thimble swings. This gives it the longest diameter possible so as to increase the length of it and gives it a more accurate bearing on the workpiece. The distance between the pivot on which the thimble swings and the work edge is about one-third of the distance between the pivot and the contact surface or edge at the top of the thimble. Therefore, in adjusting the workpiece it moves the contact surface three times as far as the workpiece moves and the contact surface moves the indicator 20 three times as far as the workpiece moves, thus making the pointer 20 move nine times as far as the workpiece moves.

Mounted on the sleeve 5 is a bracket 12 between one end of which and the sleeve is pivotally mounted an arm 13. This arm is made with a slot 14 which slot could be 1¼" in length.

On the arm 13 is mounted an indicator 15 of any standard make. This indicator is supported on a screw one end of which is riveted on the indicator 15. The screw passes through the slot 14. This screw has an enlarged head 16. The threaded shank of the screw passes through the slot 14. A thumb nut 17 is provided which engages with the threaded shank of the screw and between the thumb nut and the head 16, the arm 13 is clamped so as to hold the indicator semi-rigid in the correct angular position thereon as is indicated in Figures 4, 11, 12 and 13 in the drawings.

The length of the head 16 and the thickness of the arm 13 are so arranged that the central portion of the indicator 15 will be held substantially in line with the axis of the shank 6.

On the bottom of the indicator is carried a contact point 18. At the top of this indicator 15 is carried a pointer 20 which is connected to the contact point 18 by a compound lever (not shown) it being understood that this indicator is an old and well-known article of manufacture. A slight movement of the contact point 18 will cause the pointer 20 to move over several divisions of the scale indicated at 21.

The contact edge 11 can be firmly held against the edge of the workpiece so that the thimble and shank will be held against rotation. A slight pressure of the finger from the left in Figure 4 below the pivot 8 is sufficient for this purpose. The assembly of the sleeve 5, arm 13 and indicator 15 can be rotated around the shank 6 and the thimble 7. If the contact edge 11 of the thimble is in line with the true axis of the spindle of the jig borer and the indicator with its contact point 18 and the pointer 20 rotated through an angle of 180° the reading of the pointer 20 will be substantially the same at the beginning and end of the movement. It will be understood that the measurement will be best made when the contact point 18 starts at a point on the rim of the thimble that is 90° from the contact edge 11. If the spindle, chuck or adapter of the jig borer runs eccentric to the true axis of the spindle the reading of the pointer 20 will vary when the indicator 15 is in intermediate position.

The beginning and end of the movement of the indicator assembly through 180° is indicated by the full and dotted line positions of the indicator 15 in Figure 11.

If the contact edge 11 of the thimble is not in line with the true axis of the spindle of the jig borer the readings of the pointer 20 taken 180° apart will not be the same.

It will be noticed that the contact rim 25 of the thimble is about three times as far above the pivot 8 as the contact edge 11 is below the pivot 8 so that the rim 25 moves nearly three times as far as does the edge 11. This reading will be doubled by rotating the indicator 15, 180°. It will also be understood that the pointer 20 moves many times as far as the contact point 18 so that the movement of the pointer 20 is the product of these two factors multiplied together which therefore will give a very fine indication of the setting of the contact edge 11.

It will be understood that the sleeve 5 turns with the spindle and turns on the shank 6 as above pointed out. On top of this sleeve 5 is a cap or retainer 26 which is counter bored so as to make it hollow to permit the up and down movement of the head of the screw 27. This cap makes a pressed fit with the sleeve 5 and rotates with it. Between the lower end of the cap 26 and the shank 6 is provided a spring 28 and as the sleeve 5 and cap 26 move down on the shank 6 the spring 28 is compressed and the expansion of the spring will return the parts to the normal position shown in Figure 4. The spring permits the thimble 7 to yield upwardly in case any part of it makes improper contact with the work piece.

It will be understood that in making adjustment with this instrument for any of the purposes described herein that the spindle of the jig borer is not driven by power, but is turned backward and forward by hand. In this way the indicator 15 is turned from the one position to the other shown in Figure 11 and the shank 6 is held against turning because the edge 11 bears against the workpiece.

After the adjustment of the workpiece is completed the instrument is removed from the jig boring machine and the drill and the boring tool are substituted for it in the spindle and power is applied for the purpose of drilling and boring the hole in the workpiece in the usual way.

In Figures 12 and 13 I have shown the instrument applied to the adapter or spindle of a jig borer in which the rotation of the spindle is not concentric with its own axis. In other words it is applied to a jig borer in which the spindle, chuck or adapter slightly gyrates on the axis. In both of these figures the edge of the work piece and the contact edge 11 of the thimble is in line with the true axis of the spindle and the thimble swings from the left position in Figure 13 to the right position in Figure 12 as the indicator is moved through 180° and in both of these extreme positions the pointer 20 of the indicator occupies the same mid position. This is due to the fact that the pivot 8, on which the thimble swings moves from the left of the axis an equal distance to the right of the axis and this neutralizes any error in the reading of the pointer 20 on the indicator 15. This is further due to the fact that the indicator is semi-rigidly mounted on the spindle of the jig borer because of the sleeve, and the movement of the pivot 8 from the left of the axis to the right is proportioned to the revolution of the indicator as the spindle moves around the true axis.

In Figure 8, I have shown a shank 6a and a thimble 7a. On the end of this shank 6a is a head similar to the head 9 in Figure 4 with the pivot pins 8, 8 as shown in Figure 5.

The inside of the thimble 7a is exactly the same as the inside of the thimble 7 in Figure 4 except that the spring 10 is omitted.

The bottom of the thimble is cut away to form a V-shaped groove that engages over a pin. If it is necessary to locate the center line of a hole 35 shown in Figures 1 and 3 in the side or end of the work piece, a pin such as 35a shown in Figure 8 is inserted in the hole and for all practical purposes it becomes part of the work piece. The work piece can then be adjusted so that both sides of the V-shaped groove will bear on the pin the axis of which will correspond with the axis of the hole in the work piece. In this set up the sleeve and spindle will be rotated 180° as shown in Figure 11 to correct the setting of the table and the work piece upon which setting other adjustments can then be made as called for by the working drawings.

The instrument will then indicate the location of the center line of the hole with reference to the true axis of the spindle as above described. When the assembly is used in this way the spring 28 becomes important because the instrument is pressed down on the pin to some extent and the spring must yield.

Having located the axis of the hole in this way with reference to the axis of the spindle, the assembly comprising the part shown in Figure 8 can be removed and the assembly shown in Figure 4 can be substituted by which the location of the edge of the work piece can be measured with reference to the spindle and further adjustment of the work piece can be made so that the machining of the work piece can be completed. Either of the foregoing operations can precede the other operation.

In Figures 9 and 10 I have shown the further modification of the thimble shown in Figure 8 in which the thimble 7b is provided with a hole 40 in which the pin 41 is placed. This pin makes a sliding fit with the hole 40 and also makes a sliding fit with the hole 35 in the work piece so that the position of the axis of the hole with relation to the true axis of the spindle of the jig borer can be measured. The pin 41 is engaged with the hole in the work piece by moving the assembly so that the pin is somewhat below the hole in the work piece. The thimble 7b can then be raised up and tilted on its axis 8, 8 until the pin 41 is in line with the hole in the work piece into which it can then be pushed. In each case the diameter of the exposed end of the pin should be such as to make a sliding fit with the hole in the work piece, the diameter of which hole will change from time to time.

The operation of the device generally is as follows: The drill or boring tool is removed from the chuck and the instrument is inserted in the chuck instead so that the sleeve 5 will turn with the spindle of the machine.

The assembly of the shank 6 and the thimble 7 is turned independent of the sleeve 5 and the chuck 4 and spindle 3 until the contact edge 11 is parallel to the edge of the workpiece. The edge of the workpiece is then brought against the contact edge 11 of the thimble.

Ordinarily if the workpiece is moved against the contact edge 11 the thimble and the shank will turn in the sleeve until the contact edge 11 stands parallel to the edge of the workpiece. In such case the axis of the thimble may or may not be in line with the axis of the shank and it is then necessary to move the workpiece forward or back until the axis of the thimble is in line with the axis of the shank. With the indicator 15 in the full line position shown in Figure 11 the indicator is then moved to the dotted line position and if the readings of the pointer 20 coincide in the two positions, then the edge of the workpiece is in line with the axis of the shank and the axis of the spindle, but if the readings do not coincide, then the workpiece must be moved forward or back until the indicator 20 in both the full line and the dotted line position gives the same reading.

Then the workpiece is in the correct starting position and can be moved the desired distance in one direction by the screw adjustment provided on the machine as shown in Figure 1. This will bring the workpiece into the correct position on an imaginary line under the axis of the spindle measured from and parallel to the one side of the workpiece. This screw adjustment will thereafter not be disturbed. Then the workpiece is moved by the other screw adjustment until the edge 11 of the indicator can be applied to the edge of the adjoining side of the workpiece or to the side at right angles to the first side above described. The same procedure is followed to correctly position that edge of the workpiece with reference to the axis of the shank and spindle and then the workpiece is moved laterally the desired distance by the other screw adjustment shown in Figure 1. In this way two imaginary lines are established and where these lines cross is the point that indicates the final position of the workpiece under the spindle of the jig boring machine and will establish the point that determines the axis of the hole to be finished. This hole is first drilled and then bored in the well-known manner and when finished the hole will be accurately located because of the use of the instrument of my invention in the manner above described.

I claim:

1. In an instrument for indicating the location of a workpiece on a jig boring machine the combination of a shank, a thimble, a pivot connecting said thimble to said shank, said thimble having a section thereof extending below and above said pivot, said section of said thimble extending above said pivot having a portion provided with an exterior finished cylindrical surface normally concentric with respect to said shank, indicating means engaging said exterior cylindrical surface, said indicating means being rotatably mounted on said shank, and means on said thimble for engaging said workpiece.

2. In an instrument for indicating the location of a workpiece on a jig boring machine the combination of a shank, a thimble, a pivot connecting said thimble to one end of said shank, said thimble having sections thereof extending below and above said pivot, said section of said thimble extending above said pivot having a portion provided with a finished cylindrical surface normally concentric with respect to said shank, said cylindrical surface adapted to contact indicating means, and means on said thimble positioned below said pivot for engaging said workpiece.

3. In an instrument for indicating the location of a workpiece on a jig boring machine the combination of a shank, a thimble, a pivot connecting said thimble to said shank, said thimble having a section thereof extending below and above said pivot, said section of said thimble extending above said pivot having a portion provided with a finished cylindrical surface normally concentric with respect to said shank, said cylindrical surface adapted to contact indicating means, said section of said thimble extending below said pivot having a depending straight workpiece engaging edge below said pivot and parallel to the axis thereof.

4. In an instrument for indicating the location of a workpiece on a jig boring machine the combination of a shank having a pair of opposed ends, a thimble having a pair of opposed ends, a pivot connecting one end of said shank with and adjacent to one end of said thimble, said thimble having a finished cylindrical surface adjacent the other end thereof adapted to contact indicating means, means on said first named end of said thimble for engaging said workpiece, the distance between the axis of said pivot to said other end of said thimble being greater than the distance between said axis and said first named end of said thimble.

5. In an instrument for indicating the location of a workpiece on a jig boring machine the combination of a shank, a substantially hollow thimble having open and closed opposed ends, said thimble surrounding a portion of one end of said shank, a pivot connecting one end of said shank with said thimble, said thimble having a finished cylindrical surface adjacent said open end adapted to contact indicating means, workpiece engaging means on said closed end for contacting said workpiece, a spring disposed between said one end of said shank and said closed end of said thimble, said spring being compressed by movement of said workpiece in contacting said workpiece engaging means.

6. In an instrument for indicating the location of a workpiece on a jig boring machine said instrument comprising a shank, a thimble, and a sleeve rotatably mounted on said shank, a pivot connecting said thimble to said shank, said thimble extending below and above said pivot and having an upper edge, a work contacting edge on said thimble below the pivot, which edge makes contact with the edge of the workpiece, an indicator provided with a pointer and mounted on said sleeve for rotation therewith, pointer operating means engaging the upper edge of the thimble as said thimble swings on its pivot when moved by the workpiece for the purpose of making indications of different angular positions of the thimble with reference to the shank.

7. In an instrument for indicating the location of a workpiece on a jig boring machine the combination of a shank, a thimble, a pivot connecting said shank to said thimble, said thimble extending below and above said pivot, a straight work contacting edge on said thimble below the pivot, which edge makes contact with the edge of the workpiece, a sleeve rotatably mounted on the shank and surrounding a portion thereof while the contacting edge of the thimble remains stationary against the edge of the workpiece, a cap fixedly mounted on one end of the sleeve, a spring in the sleeve interposed between the cap and shank, said spring normally urging said shank and said thimble away from said sleeve.

8. In an instrument for indicating the location of a workpiece on a jig boring machine the combination of a shank and a thimble, a pivot connecting said thimble to said shank, said thimble extending below and above said pivot, a straight work contacting edge on said thimble below the pivot which edge makes contact with the edge of the workpiece, a sleeve rotatably mounted on said shank while the contacting edge of the thimble is held stationary by the edge of the workpiece, a cap fixedly mounted on one end of the sleeve, a spring in the sleeve interposed between the cap and the shank, a screw extending through said cap and connecting with the shank, and means on the screw by which the downward movement of the shank is limited.

9. In an instrument for indicating the location of a workpiece on a jig boring machine the combination of a shank and a thimble, a pivot connecting said thimble to said shank, said thimble extending below and above said pivot, a straight work contacting edge on said thimble below the pivot which edge makes contact with the edge of the workpiece, a sleeve mounted for rotary motion on said shank while the contacting edge of the thimble is held stationary by the edge of the workpiece, a cap in the top of the sleeve, a spring in the sleeve interposed between the cap and the shank, a screw extending through said cap and connecting with the shank, a head on the screw by which the downward movement of the shank is limited when the head rests on the cap.

10. In an instrument for indicating the location of a workpiece on a jig boring machine, said instrument comprising a shank, means attached to the shank for contacting the edge of a workpiece and indicating the location of the edge of the workpiece with reference to the axis of the machine spindle, said means comprising a thimble having opposed ends, a pivot by which said thimble is connected to one end of the shank, said thimble having a straight work contacting edge on one end thereof that engages the edge of the workpiece, the other end of the thimble being adapted to move further than said first end of the thimble when the thimble swings on its pivot, a multiplying indicator rotatably mounted on said shank, said indicator reacting on said other end of the thimble for the purpose of indicating the position of said first end of the thimble with reference to the axis of the machine spindle.

11. In an instrument for indicating the location of a workpiece on a jig boring machine, said instrument comprising a shank, a thimble, a pivot connecting said thimble to said shank, said thimble extending below and above the pivot, said thimble having a curvilinear contacting end on said portion above said pivot, a contacting straight edge on said thimble below the pivot which edge makes contact with the edge of the workpiece, a sleeve rotatably mounted on said shank while the contacting edge of the thimble remains stationary against the edge of the workpiece, an indicator carried on said sleeve and moving with it, said indicator being adapted to move around said curvilinear contacting end of the thimble for the purpose of contacting the opposite sides thereof, thereby showing whether the contacting straight edge of the thimble and the workpiece is correctly positioned with reference to the axis of the machine spindle.

12. In an instrument for indicating the location of a workpiece on a jig boring machine, said instrument comprising a shank, cylindrical means having opposed ends, a pivot connecting said indicating means to said shank, one end of said means being adapted to be contacted by a workpiece, said means being so shaped that said other end will move further than said first end when moved by the adjustment of the workpiece, indicating means including a multiplying pointer said indicating means being rotatably mounted on said shank and operated by said other end of said cylindrical indicating means for the purpose of indicating the position of the edge of the workpiece with reference to the axis of the machine spindle.

13. An instrument for use in a jig boring machine for locating the edge of a workpiece with reference to the axis of the spindle of the jig boring machine, said instrument having a shank, a thimble having a cylindrical form, a sleeve rotatably mounted on said shank, said shank extending into the thimble and being connected thereto by a pivot, said thimble having a portion depending therefrom, said portion having a straight edge placed diametrically across said thimble and positioned below the pivot and parallel to the axis thereof.

14. In an instrument for indicating the location of a workpiece on a jig boring machine the combination of a shank, a thimble, a pivot connecting said thimble to said shank, said thimble having a secton thereof extending below and above said pivot, said section of said thimble extending above said pivot having a portion provided with a finished cylindrical surface normally concentric with respect to said shank, said cylindrical surface adapted to contact indicating means, said section of said thimble extending below said pivot having a depending portion provided with an inverted V-shaped groove formed therein, said V-shaped groove being adapted for engagement with said workpiece.

15. In an instrument for indicating the location of a workpiece on a jig boring machine the combination of a shank, a thimble, a pivot connecting said thimble to said shank, said thimble having a section thereof extending below and above said pivot, said section of said thimble extending above said pivot having a portion provided with a finished cylindrical surface normally concentric with respect to said shank, said cylindrical surface adapted to contact indicating means, said section of said thimble extending below said pivot having an aperture formed therein for slideably receiving said workpiece.

JAMES G. RADTKE.

REFERENCES CITED

The following references are of record in the file of this patent:

UNITED STATES PATENTS

| Number | Name | Date |
| --- | --- | --- |
| 869,483 | Dennis et al. | Oct. 29, 1907 |
| 910,706 | Montan | Jan. 26, 1909 |
| 1,252,777 | Casler | Jan. 8, 1918 |
| 1,341,935 | Schustarich | June 1, 1920 |
| 1,984,864 | Cole et al. | Dec. 18, 1934 |
| 2,216,766 | Dook | Oct. 8, 1940 |
| 2,356,300 | Boettcher | Aug. 22, 1944 |

OTHER REFERENCES

Machinery, Jan., 1925, page 394, published by Industrial Press, 140–8 Lafayette St., New York, N. Y.